Jan. 17, 1967   J. M. TAYLOR ET AL   3,298,716
LINED PIPE AND PIPE JOINTS AND METHOD OF LINING
PIPE AND JOINING LINED PIPE
Filed Aug. 31, 1964   3 Sheets-Sheet 1
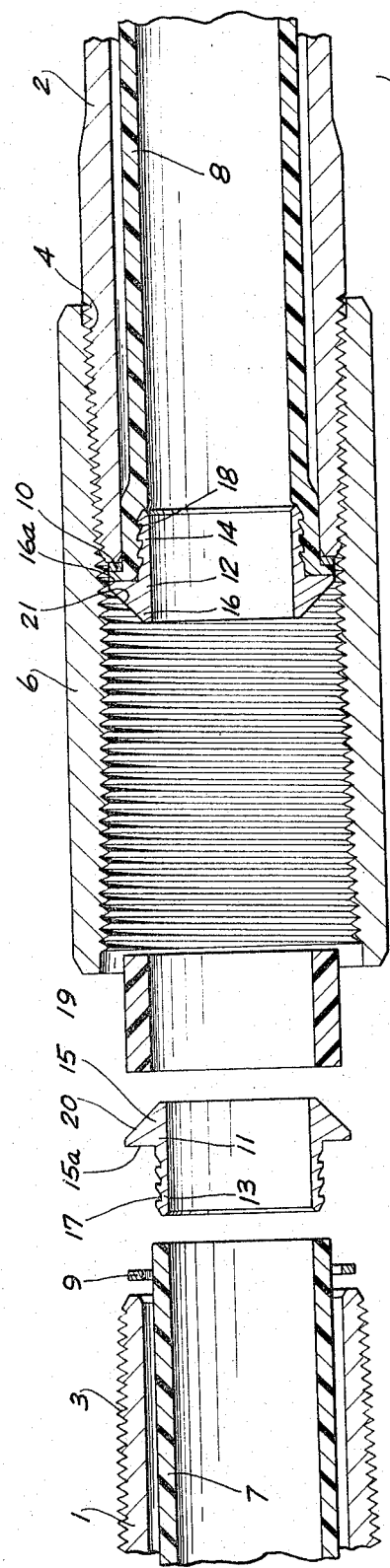
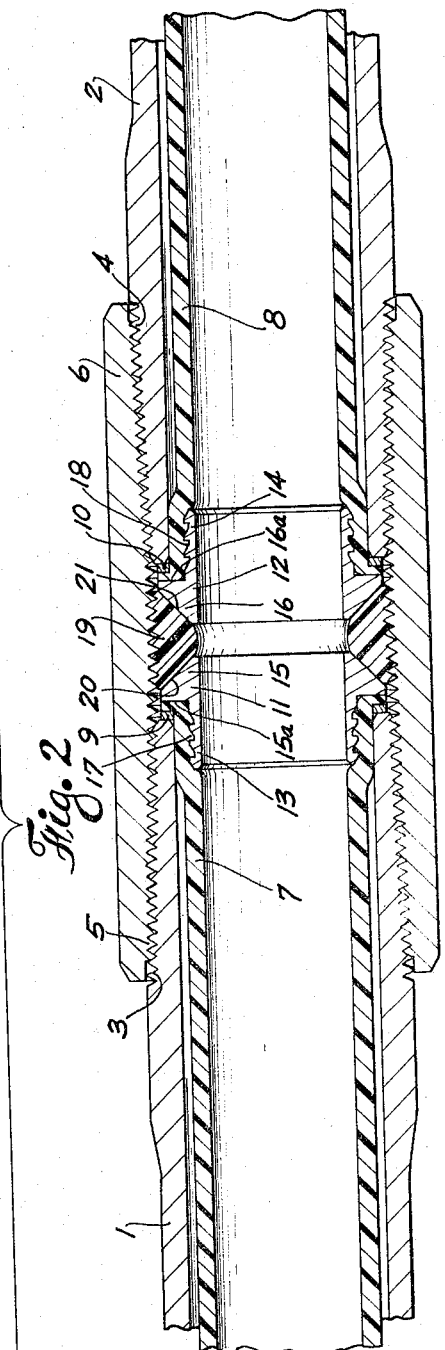
JOHN W. TURNER
JOSEPH M. TAYLOR
INVENTORS
BY Vincent Martin
Joe E. Edwards
Jack R. Springgate
ATTORNEYS

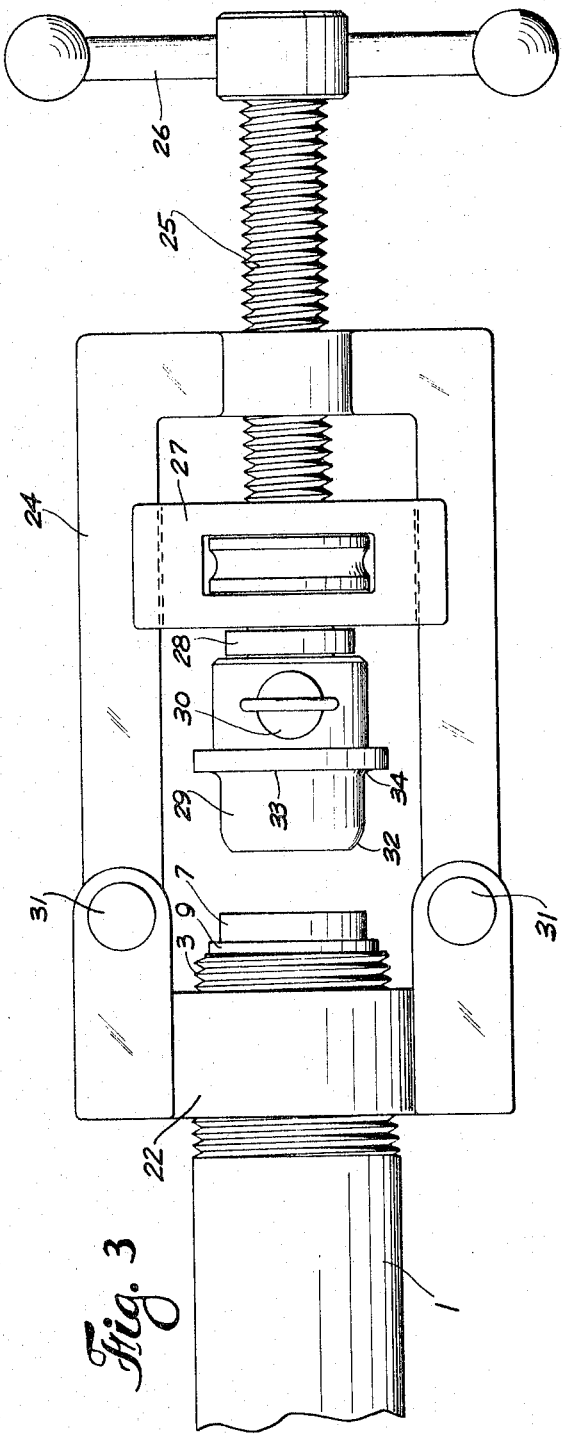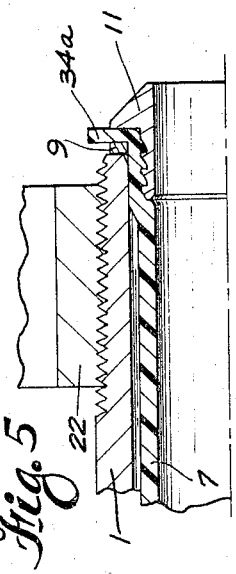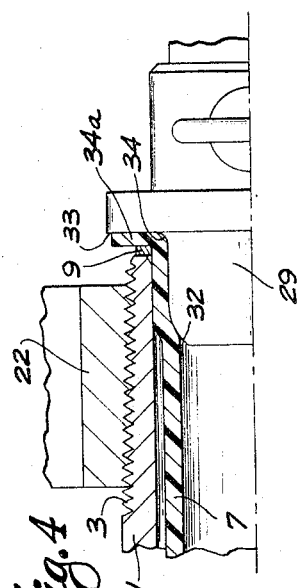

Jan. 17, 1967   J. M. TAYLOR ET AL   3,298,716
LINED PIPE AND PIPE JOINTS AND METHOD OF LINING
PIPE AND JOINING LINED PIPE
Filed Aug. 31, 1964   3 Sheets-Sheet 3
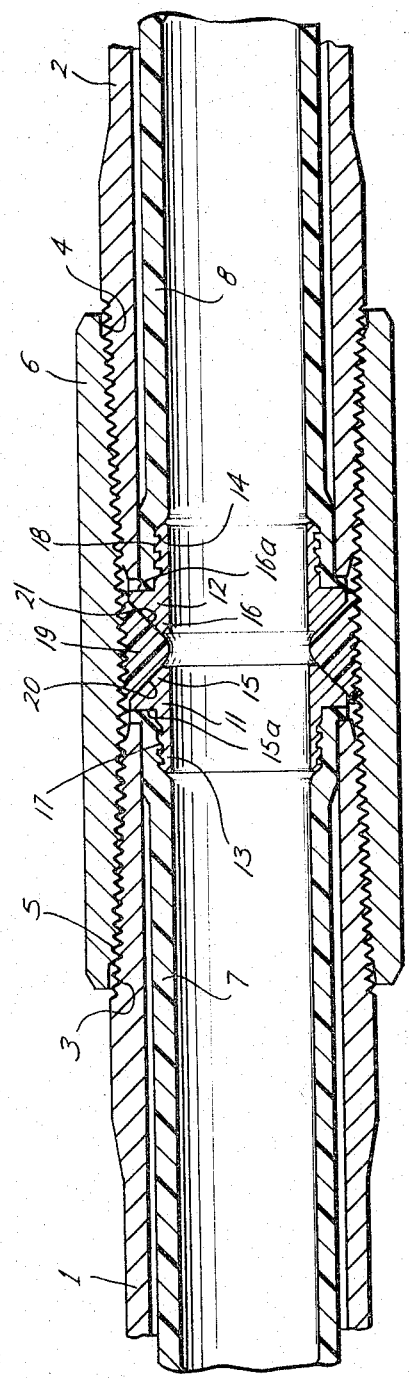
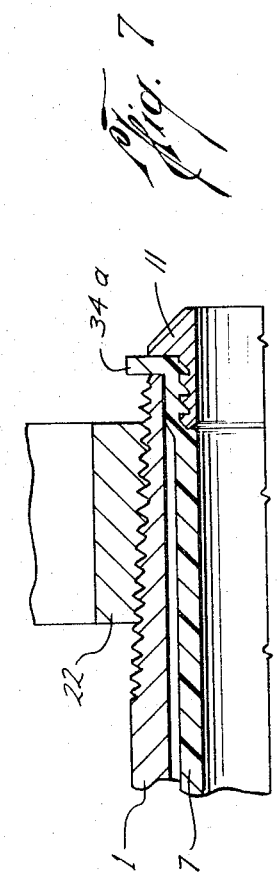
John W. Turner
Joseph M. Taylor
INVENTORS
BY Vincent Martin
Joe E. Edwards
Jack R. Springgate
ATTORNEYS

United States Patent Office 3,298,716
Patented Jan. 17, 1967

3,298,716
LINED PIPE AND PIPE JOINTS AND METHOD OF LINING PIPE AND JOINING LINED PIPE
Joseph M. Taylor and John W. Turner, Houston, Tex., assignors to Taylor Tube Seal, Inc., Houston, Tex., a corporation of Texas
Filed Aug. 31, 1964, Ser. No. 394,384
5 Claims. (Cl. 285—55)

The present application is a continuation-in-part of application Serial No. 302,254, filed August 15, 1963, and now abandoned.

The present invention relates to pipe having a corrosion resistant lining and to a method of lining pipe and joining pipe which is lined with a corrosion resistant material. More specifically, the present invention relates to pipe lined with a thermoplastic material and to the method of securing such thermoplastic material within the pipe and to the method of joining two sections of pipe having such thermoplastic lining together to form a corrosion resistant, pressure-tight joint.

The present invention is particularly suitable for use in production tubing for oil and gas wells which produce fluids which are corrosive to pipe not having a corrosion resistant lining and for use in any other corrosion type service. Prior to the present invention much work has been done to provide a corrosion resistant lining for pipe. In many such cases an actual welding of the lining has been performed at each joint. Such joining of the lining has the distinct disadvantage of having to be cut each time it is desired to disconnect the pipe joints. Other efforts have been made to provide a resilient gasket between the pipe ends within a pipe coupling but such efforts have not been successful because they do not provide an effective pressure seal, are not completely corrosion resistant and usually result in an obstruction to the flow through the pipe.

Therefore the primary object of the present invention is to provide a corrosion resistant pipe lining and a corrosion resistant joint between sections of such lined pipe.

Another object of the present invention is to provide a method of lining pipe and of joining pipe lined with corrosion resistant material.

Still another object of the present invention is to provide a method of joining two lengths of pipe which have a thermoplastic lining wherein the joint so formed is corrosion resistant, pressure-tight and free of internal obstructions.

A further object of the present invention is to provide a method of joining lined pipe which is readily assembled and disassembled.

A still further object of the present invention is to provide a method of providing a corrosion resistant lining of thermoplastic material secured within the pipe whereby two sections of such lined pipe are readily coupled together to form a corrosion resistant and pressure-tight joint.

Still a further object of the present invention is to provide a structure for securing a corrosion resistant lining of thermoplastic material within a length of pipe whereby such pipe may be readily coupled to form a pressure-tight, corrosion resistant joint and uncoupled without disturbing the pipe lining.

These and other objects of the present invention will become apparent from the following description of the details of the invention with reference to the drawings wherein:

FIGURE 1 is a cross-sectional view of a pipe joint constructed and joined in accordance with the present invention.

FIGURE 2 is a partially exploded cross-sectional view of a lined pipe joint and some of the components of the joint prior to their assembly into the pipe joint.

FIGURE 3 is a plan view illustrating a tool used to secure a lining within a pipe.

FIGURE 4 is a partial sectional view illustrating the forming of the lining at one end of a length of pipe.

FIGURE 5 is a partial sectional view similar to FIGURE 4 illustrating the lining after forming and insertion of the ferrule but prior to trimming.

FIGURE 6 is a view similar to FIGURE 1 illustrating another form of the present invention.

FIGURE 7 is a view similar to FIGURE 5 illustrating the embodiment of FIGURE 6 prior to trimming the excess lining.

Referring more in detail to the drawing, pipes 1 and 2 are standard pipes having pipe threads 3 and 4 at their respective ends engaging the internal threads 5 on coupling 6. Liner 7 is positioned within pipe 1 and liner 8 is positioned within pipe 2. Liners 7 and 8 may be of any suitable thermoplastic material which will be resistant to the corrosive conditions to which it is to be exposed. Polypropylene has been found to be suitable as a lining on pipe which is used for the production of high pressure natural gas and distillates containing corrosive compounds such as hydrogen sulfide and salt water.

Annular ring 9 is positioned on the end of pipe 1 and the end of liner 7 is formed radially outward over annular ring 9. Annular ring 10 is positioned similarly on the end of pipe 2 and the inner end of liner 8 is formed radially outward over annular ring 10. The rings 9 and 10 are useful in preventing damage to the formed end of the liner 7, 8 as the joint is assembled or made up when the end of the pipe 1, 2 is rough or jagged.

Ferrules 11 and 12 are annular in shape and include tubular body portions 13 and 14 and protruding frustoconical nose portions 15 and 16 respectively having shoulders 15a and 16a which engage the formed ends of liners 7 and 8. The exterior of tubular body portions 13 and 14 are provided with grooves 17 and 18 respectively. Any type of serrations or threads may be substituted for grooves 17 and 18 which provide adequate engagement between ferrule 11 and liner 7 and between ferrule 12 and liner 8. The interior of ferrules 11 and 12 have substantially the same diameter as the interior of liners 7 and 8.

It is preferred that ferrules 11 and 12 be made of a completely corrosion resistant material which has sufficient strength to resist cracking when two sections of pipe are made into a pipe joint. A metal material such as heat treated K Monel metal has been found to be very suitable and in actual practice ferrules made of such material have performed very satisfactorily. Such heat treated K Monel is an age-hardened alloy having approximately the following composition: nickel—65.3%, copper—29.5%, iron—1%, titanium—0.5%, manganese—0.6, carbon—0.15%, silicon—0.15%, and sulphur—0.005%.

Gasket 19 is positioned in compressed form between conical surfaces 20 and 21 of ferrules 11 and 12 respectively and the interior of coupling 6. In its uncompressed form as shown in FIGURE 2 gasket 19 is tubular in shape. It is preferred that gasket 19 be made from the same material as used for liners 7 and 8; however, any material which is resistant to the corrosion conditions to which the pipe is to be exposed and which will deform or cold flow when compressed within a pipe joint as shown in FIGURE 1 to seal the interior of the joint may be used without departing from the present invention.

Surfaces 20 and 21 preferably lie in a cone having its apex on the centerline and beyond the end of pipes 1 and 2. For example the apex of the conical extension of surface 20 would be on the centerline of pipe 1 beyond the end of pipe 1. Also it is preferred that the angle of surfaces 20 and 21 with relation to the centerline of pipes 1 and 2 be approximately 42 to 44 degrees. However, it is contemplated that such angle may be varied from approximately 30 to 75 degrees provided the angle is such that gasket 19 is compressed and seals against surfaces 20 and 21 and against the interior of coupling 6. With this angle on surfaces 20 and 21, gasket 19 will seal on such surfaces when compressed and will be forced outward into engagement with the interior of coupling 6 and prevented from distortion inward to partially obstruct flow through the joint.

In the embodiment shown in FIGURES 6 and 7, the annular rings 9 and 10 shown in FIGURES 1 through 5 have been eliminated. The joint is assembled so that the ends of the pipes 1 and 2 engage and seal with the formed ends of liners 7 and 8, respectively. It has been found in actual use of the present invention that, where the pressure on the exterior of the coupling or pipe is very high (as in a high pressure well), the exterior fluids may be forced between threads 5 on coupling 6 and threads 3 and 4 on the exterior of pipes 1 and 2; then between the end of the pipes 1 and 2 and the rings 9 and 10; and into the annulus formed between the interior of the pipes 1 and 2 and the exterior of the liners 7 and 8. The high pressure fluid may then cause the liners 7 and 8 to bulge inwardly and create an obstruction to flow therethrough. This problem is overcome by eliminating rings 9 and 10, and sealing between the ends of the pipes 1 and 2 and the formed ends of the liners 7 and 8 respectively, to prevent the inward flow of any exterior fluid beyond such sealing points. If the rings 9 and 10 are eliminated, the ends of pipes 1 and 2 are preferably trimmed smooth and square with the axis of the pipe to provide a proper surface for sealing engagement with the formed end of the liners 7 and 8. This preliminary preparation of the end of the pipe may be accomplished by cutting or grinding off a sufficient portion of the end of the pipe to provide the desired surface. Of course, the rings 9 and 10 may be satisfactorily used, if desired, in services where the exterior pressure is not high, such as in a plant, refinery or underground pipeline.

Having described the structure of lined pipe and lined pipe joints which are constructed in accordance with the invention, the following description relates to the method of securing the liner within the pipe and the method of connecting sections of such lined pipe into a pressure-tight, corrosive resistant joint. With reference to FIGURES 2 and 4, liner 7 should be positioned within pipe 1 and extend approximately one-half inch beyond the end of pipe 1. As has been noted, it may be desirable to first prepare the end of the pipe to provide a proper sealing surface when the rings 9 and 10 are not used.

In this position an expander device should be inserted within liner 7 and expanded to temporarily secure liner 7 in such position within pipe 1. Any type of expander which will enlarge within liner 7 to a sufficient degree to hold liner 7 against the inside of pipe 1 will be suitable provided it may be actuated exteriorly of pipe 1 and the actuating means removed during the remainder of the operations hereinafter described and then the tools reintroduced to remove the expander when such operations have been completed. The expander is necessary since the outside diameter of liner 7 is preferred to be smaller than the inside diameter of pipe 1 to allow liner 7 to be easily inserted in pipe 1 and to provide for differential expansion between liner 7 and pipe 1.

With liner 7 fixed within pipe 1, annular ring 9 (if used) is held against the end of pipe 1 and collar 22 is threaded onto thread 3 of pipe 1 to receive jack 23 as is shown in FIGURE 3. Jack 23 may be of any suitable type but is shown as a modified pipe clamp having a yoke 24, screw 25 with arm 26 attached thereto for rotation of screw 25 and bridge 27 provided with a suitable coupling device 28 to which forming member 29 may be readily attached as by pin 30. As shown yoke 24 is suitably secured to collar 22 as by pins 31.

Forming member 29 is of any suitable construction and may be provided with electric resistance elements therein to heat member 29 or it may be heated separately in an oven and then when needed attached to jack 23. Forming member 29 is round in transverse cross-section and is provided with a nose portion 32 having a reduced diameter to allow member 29 to be inserted into the end of liner 7, shoulder 33 and fillet 34 between nose portion 32 and shoulder 33. As forming member 29 is forced into liner 7 it forces liner 7 outwardly against the interior of pipe 1 (and annular ring 9, if used). As forming member 29 is pushed further into liner 7 fillet 34 will cause the end 34a of liner 7 to be formed radially outward and shoulder 33 will force the end of liner 7 against annular ring 9 as shown in FIGURE 4 or against the end of pipe 1 when the ring 9 is not used as shown in FIGURE 7.

When this forming of liner 7 is completed, forming member 29 is removed and ferrule 11 is forced into liner 7 while liner 7 is still hot as shown in FIGURES 5 and 7. The forcing of ferrule 11 into liner 7 may be done by using jack 23 and providing a suitable fitting pinned into coupling device 28 to support ferrule 11 while it is being inserted into liner 7 or any suitable device may be used for this purpose; it being understood that it is preferred that liner 7 remain hot from its contact with forming member 29 while ferrule 11 is being inserted therein. With ferrule 11 in position within liner 7 as shown in FIGURES 1, 5, 6 and 7, then the cooling of liner 7 will cause it to contract around the exterior of tubular body portion 13 of ferrule 11 and engage grooves 17 forming a relatively permanent engagement therebetween and provides a substantially constant area within liner 7 and ferrule 11 through which fluids may flow. After ferrule 11 has been set, then the end 34a of liner 7 is trimmed by any suitable device so that its outward extension is flush with the outside diameter of conical nose portion 15 of ferrule 11 (and with the outside diameter of annular ring 9, if used). Any suitable device may be used for this purpose. Thereafter collar 22 should be removed from pipe 1.

When the trimming of the excess material of liner 7 has been completed, then the expander which has been previously inserted within line 7 is removed and the pipe 1 will be ready for connection to pipe 2. It should be understood that for purpose of illustration that only one end of pipe 1 has been shown and described in relation to the installation of liner 7 but both ends should be prepared in exactly the same manner and preferably at the same time before pipe 1 is ready to be connected.

To join pipe 1 to pipe 2, coupling 6 is first threaded onto pipe 2 but should not be completely tightened thereon. With pipe 2 threaded into coupling 6, gasket 19, is inserted into coupling 6 to engage conical surface 21 of ferrule 12. Before pipe 1 is threaded into coupling 6 any thread dope which is to be used should be added to threads 3 in a limited amount. Any excess of pipe dope will be forced behind gasket 19 and with the tightening of the joint will cause gasket 19 to bulge inwardly. Such inward bulging of gasket 19 is undesirable as it will restrict the flow of fluids through the joint and will not provide a satisfactory seal against the interior of coupling 6.

Pipe 1 is then threaded into coupling 6 and rotated in the direction to tighten threads 3 within coupling 6 while pipe 2 is held stationary. This tightening action will move the conical surfaces 20 and 21 of ferrules 11 and 12 against gasket 19 whereby gasket 19 will be compressed and will deform into the shape shown in FIGURES 1 and 6 whereby a complete seal is maintained on surfaces 20 and 21 and also gasket 19 is wedged outwardly by surfaces 20 and 21 against the interior of coupling 6.

From the foregoing it can be seen that the joint which is made up as described will have all non-corrosive materials exposed to the fluids flowing through the joint since liners 7 and 8, ferrules 11 and 12 and gasket 19 are all made from a corrosive resistant material. Also, the wedging of gasket 19 outwardly will prevent it from bulging inwardly to present an obstruction to the flow of fluids through the pipe joint and will provide a pressure seal to prevent any leakage of the fluids flowing through the pipes 1 and 2 out of the joint. Thus, the invention has provided a lined pipe, a lined pipe joint and a method of assembling lined pipe and lined pipe joints which will present an interior of corrosive resistant materials to the fluids flowing through the pipe and which are readily assembled at the site where the pipe is to be installed.

The foregoing disclosure and description of the invention is illustrative and explanatory thereof, and various charges in the method, as well as in the details of the illustrated construction, may be made within the scope of the appended claims without departing from the spirit of the invention.

What is claimed is:

1. A lined pipe joint between two sections of metallic pipe, comprising
   the end portions of said pipe sections being cylindrical and of substantially constant diameter,
   a corrosion-resistant liner in each of said pipe sections and having an outer diameter smaller than the inner diameter of said pipe sections whereby said liners are easily inserted through said pipe sections,
   each of said liners in said pipe sections having a flange portion extending radially outward over the ends of said pipe sections,
   a corrosion-resistant ferrule having an outer diameter substantially larger than the inner diameter of the liner inserted into the end of each of said liners to expand the liner against the interior of said pipe section whereby the interior of said ferrule is in substantial alignment with the remainder of the interior of said liner,
   each of said ferrules having a nose portion extending beyond the flange of said liner and defining a frusto-conical gasket sealing surface,
   a cylindrical coupling for securing the ends of said pipe sections together, and
   a resilient, corrosion-resistant gasket positioned in said coupling for engagement between said gasket sealing surfaces,
   the ends of said pipe sections being adapted to tighten into said coupling whereby said gasket is compressed between said gasket sealing surfaces and is deformed into sealing engagement with the interior of said coupling and to fill the space between said ferrules to an inner diameter substantially the same as the inner diameter of said ferrules.

2. A lined pipe joint according to claim 1 wherein each of said ferrules includes a shoulder adapted to engage the flange portion of said liner.

3. A lined pipe joint according to claim 1 wherein the material of said ferrules is a Monel metal.

4. A lined pipe joint between two sections of metallic pipe, comprising
   the end portions of said pipe sections being cylindrical and of substantially constant diameter,
   a corrosion-resistant liner in each of said pipe sections and having an outer diameter smaller than the inner diameter of said pipe sections whereby said liners are easily inserted through said pipe sections,
   each of said liners in said pipe sections having a flange portion extending radially outward over the ends of said pipe sections,
   a corrosion resistant ferrule having a cylindrical portion adapted to be inserted into the end of each of said liners, a shoulder portion adapted to abut said flange portion of said liner and a nose portion defining a gasket sealing surface,
   a cylindrical, threaded coupling for securing the ends of said pipe sections together, and
   a corrosion-resistant gasket positioned in said coupling for engagement between said gasket sealing surfaces,
   the ends of said pipe sections being adapted to tighten into said coupling to move said gasket sealing surfaces on said ferrules into sealing engagement with said gasket,
   said gasket when in sealing engagement with said gasket sealing surfaces substantially filling the space between said gasket sealing surfaces of said ferrules from the interior of said coupling to an inner diameter substantially the same as said inner diameter of said ferrules and sealing against the interior of said coupling.

5. A lined pipe joint between two sections of pipe as set forth in claim 4 wherein
   said gasket-sealing surface is frusto-conical in form, the apex of said frusto-conical surface lying on the center line of said ferrule beyond the end of each of said sections of pipe whereby said gasket is compressed into sealing engagement with said gasket-sealing surface and said gasket is also compressed radially outwardly into sealing engagement with said coupling.

References Cited by the Examiner

UNITED STATES PATENTS

| | | | |
|---|---|---|---|
| 794,350 | 7/1905 | Feust | 285—149 |
| 2,088,922 | 8/1927 | Porteous | 285—55 |
| 2,613,958 | 10/1952 | Richardson | 285—55 |
| 2,986,843 | 6/1961 | Sato | 29—157 |
| 2,998,984 | 9/1961 | Gressel | 285—55 |
| 3,018,120 | 1/1962 | Vann | 285—55 |
| 3,047,937 | 8/1962 | De Vecchi | 29—157 |
| 3,191,971 | 6/1965 | Somers | 285—55 |
| 3,228,096 | 1/1966 | Albro | 285—55 |

FOREIGN PATENTS

| | | |
|---|---|---|
| 1,197,381 | 6/1959 | France. |
| 872,706 | 4/1953 | Germany. |
| 1,022,860 | 1/1958 | Germany. |
| 810,400 | 3/1959 | Great Britain. |
| 173,773 | 12/1960 | Sweden. |
| 318,957 | 1/1957 | Switzerland. |

CARL W. TOMLIN, Primary Examiner.

THOMAS F. CALLAGHAN, Examiner.

R. GIANGIORGI, Assistant Examiner.